US009389405B2

(12) United States Patent  (10) Patent No.: US 9,389,405 B2
Westphal et al.  (45) Date of Patent: Jul. 12, 2016

(54) AUTOFOCUS METHOD FOR MICROSCOPE AND MICROSCOPE WITH AUTOFOCUS DEVICE

(71) Applicant: Carl Zeiss Microscopy GmbH, Jena (DE)

(72) Inventors: Peter Westphal, Jena (DE); Reiner Mitzkus, Goettingen (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 392 days.

(21) Appl. No.: 14/106,450

(22) Filed: Dec. 13, 2013

(65) Prior Publication Data

US 2014/0168404 A1  Jun. 19, 2014

(30) Foreign Application Priority Data

Dec. 13, 2012 (DE) .......................... 10 2012 223 128

(51) Int. Cl.
*G02B 21/00* (2006.01)
*G02B 21/24* (2006.01)

(52) U.S. Cl.
CPC .................................... *G02B 21/245* (2013.01)

(58) Field of Classification Search
CPC ............................ G02B 21/244; G02B 21/365
USPC .......................................................... 348/79
See application file for complete search history.

(56) References Cited

U.S. PATENT DOCUMENTS

| | | | |
|---|---|---|---|
| 4,725,722 A | 2/1988 | Maeda et al. | |
| 4,804,831 A | 2/1989 | Baba et al. | |
| 5,604,344 A | 2/1997 | Finarov | |
| 6,341,007 B1 * | 1/2002 | Nishi | G03F 7/70216 355/53 |
| 6,376,818 B1 | 4/2002 | Wilson et al. | |
| 2003/0132394 A1 | 7/2003 | Wolleschensky et al. | |
| 2006/0186311 A1 | 8/2006 | Backs et al. | |
| 2007/0102620 A1 | 5/2007 | Bublitz et al. | |
| 2010/0033811 A1 | 2/2010 | Westphal et al. | |
| 2010/0294749 A1 | 11/2010 | Kempe et al. | |
| 2011/0134308 A1 | 6/2011 | Arnz et al. | |

FOREIGN PATENT DOCUMENTS

| | | |
|---|---|---|
| DE | 36 36 951 A1 | 6/1987 |
| DE | 195 37 376 A1 | 4/1996 |
| DE | 103 19 182 A1 | 12/2004 |
| DE | 10 2006 027 836 A1 | 12/2007 |
| DE | 10 2007 055 530 A1 | 5/2009 |

(Continued)

*Primary Examiner* — Jeffery Williams (74) *Attorney, Agent, or Firm* — Christensen Fonder P.A.

(57) ABSTRACT

An autofocus method for a microscope with an objective which images a sample lying in an object plane, including the steps: projecting a longitudinally extended grating slit which lies in a grating slit plane onto the sample, and imaging the projection of the grating slit onto an autofocus camera; determining an intensity distribution of the grating slit image and from this, deducing a preset for a relative adjustment of sample and object plane; projecting a likewise longitudinally extended comparison slit onto the sample, and imaging the projection of the comparison slit onto the autofocus camera; evaluating the width of the comparison slit image at right angles to the longitudinal extension at at least two sites which are spaced apart along the longitudinal extension, and determining a width variation of the comparison slit image, a gradient of the width variation and a direction of the relative adjustment.

17 Claims, 5 Drawing Sheets

(56) References Cited

FOREIGN PATENT DOCUMENTS

| DE | 10 2008 005 355 A1 | 7/2009 |
| DE | 10 2008 015 885 A1 | 10/2009 |
| EP | 1 248 132 A2 | 10/2002 |
| EP | 1 417 454 B1 | 5/2009 |
| EP | 2 030 062 B1 | 9/2010 |
| JP | H09-281384 A | 10/1997 |
| WO | WO 98 45745 A1 | 10/1998 |
| WO | WO 2004/038483 A1 | 5/2004 |
| WO | WO 2007/144197 A1 | 12/2007 |

\* cited by examiner

Fig. 7

AUTOFOCUS METHOD FOR MICROSCOPE AND MICROSCOPE WITH AUTOFOCUS DEVICE

PRIORITY CLAIM

The present application claims priority to German Patent Application No. 102012223128.5 filed on Dec. 13, 2012, which said application is incorporated by reference in its entirety herein.

FIELD OF THE INVENTION

The invention relates to an autofocus method for a microscope with an objective which images a sample lying in an object plane.

The invention further relates to a microscope with an objective which has an object plane lying in a sample space, and with an autofocus device.

BACKGROUND OF THE INVENTION

WO 2007/144197 A1 describes an autofocus device which images into the sample a modulation object that is intensity-modulated periodically along one direction, and which generates an autofocus signal from the image of the modulation object. Embodiments of the claimed invention improve upon such known devices.

SUMMARY OF THE INVENTION

An object of the claimed invention is to develop a microscope or an autofocus method of the type named at the beginning such that the autofocus function is realized over a larger depth range.

The object is achieved with an autofocus method for a microscope with an objective which images a sample lying in an object plane, the method comprising the following steps:

a) projecting onto the sample a longitudinally extended grating slit which extends in a grating slit plane, and imaging the projection of the grating slit as a grating slit image onto an autofocus camera which has a camera image plane, wherein either the grating slit plane or the camera image plane lies at an angle to a plane which is conjugate to the object plane, b) projecting onto the sample a longitudinally extended comparison slit which extends parallel to the grating slit in the grating slit plane and is not structured along its longitudinal extension, and imaging the projection of the comparison slit, as a comparison slit image onto the autofocus camera, and c) determining a width of the comparison slit image at right angles to the longitudinal extension at at least two sites which are spaced apart along the longitudinal extension, d) determining a width variation of the comparison slit image and a gradient of the width variation, and e) determining a direction of a relative adjustment of sample and object plane.

The object is likewise achieved with an autofocus method for a microscope with an objective which images a sample lying in an object plane, the method comprising the following steps:

a) projecting onto the sample a longitudinally extended grating slit which extends in a grating slit plane, and imaging the projection of the grating slit as a grating slit image onto an autofocus camera which has a camera image plane, wherein either the grating slit plane or the camera image plane lies at an angle to a plane which is conjugate to the object plane, b) projecting onto the sample a longitudinally extended comparison slit which is structured complementary to the grating slit and extends parallel to the grating slit in the grating slit plane, and imaging the projection of the comparison slit onto the autofocus camera and combining this image with the grating slit image to form a comparison slit image, and c) evaluating the width of the comparison slit image at right angles to the longitudinal extension at at least two sites which are spaced apart along the longitudinal extension, d) determining a width variation of the comparison slit image and a gradient of the width variation, and e) determining a direction of a relative adjustment of sample and object plane.

The object is also achieved with a microscope with an objective which has an object plane lying in a sample space, and with an autofocus device which has a longitudinally extended grating slit which extends in a grating slit plane, a longitudinally extended comparison slit which extends parallel to the grating slit in the grating slit plane, an autofocus illumination optical unit which projects the grating slit and the comparison slit into the sample, an autofocus camera with the camera image plane, wherein either the grating slit plane or the camera image plane lies at an angle to a plane which is conjugated to the object plane, an autofocus imaging optical unit which images the projection of the grating slit onto the autofocus camera to form an grating slit image on the camera, and which further images the projection of the comparison slit onto the autofocus camera to form a comparison slit image on the camera, and a control device which is of one of the following two types: a first type in which the control device evaluates the width of the comparison slit image at right angles to the longitudinal extension of the comparison at at least two sides which are spaced apart along the longitudinal extension and determines a width variation of the comparison slit image and a gradient of the width variation, and determines direction of a relative adjustment of sample and objective plane, or of a second type, which combines the image of the projection of the comparison slit together with the image of grating slit to form a modified comparison slit image, evaluates the width of the modified comparison slit image at right angles to the longitudinal extension at at least two sides which are spaced apart along the longitudinal extension, determines a width variation of the modified comparison slit image and a gradient of the width variation, and determines a direction of relative adjustment of sample and object plane. If the control device is of the first type, the comparison slit is not structured and if the control device is of the second type, the comparison slit is structured complementary to the grating slit.

In other words, the control device of the microscope is designed to carry out an autofocus method of the two types mentioned above.

The state of the art calls the working range of an autofocus device the capture range. The invention supplements the autofocus principle of WO 2007/144197 A1 with respect to the capture range. In areas in which the known autofocus principle no longer has a sufficient grating contrast for the known autofocus function, it is determined in what direction the relative shift of sample and object plane must take place in order to obtain a sufficient grating contrast again. For this, the invention evaluates the width of the comparison slit image. As the comparison slit image, like the grating slit image, lies at an angle to the object plane—which is achieved by inclining the grating slit plane or the camera image plane relative to the optical axis of the imaging—the width of the comparison slit image varies along the longitudinal extension if the objective is defocused. This has the result that it can be deduced from the width variation of the comparison slit image, and knowing the direction of the inclination, in what direction any relative shift of sample and object plane must be effected in order to reach the capture range of the grating contrast evaluation based conventional autofocus.

The comparison slit image can be generated from two variants. Firstly, it is possible to use a comparison slit that is not structured along its longitudinal extension. Secondly, it is possible to use a comparison slit which is structured complementary to the grating slit. It supplements the grating slit image to form an unstructured comparison slit image which is obtained by combining the grating slit image and the comparison slit image. This combination is also referred to as modified comparison slit image when the distinction to the image of the protection of the comparison slit shall be emphasized. Both variants obtain a (modified) comparison slit image which has no grating-related intensity fluctuations along its longitudinal extension, whereby the width of the (modified) comparison slit image can be evaluated without difficulty.

The term "a comparison slit that is not structured in the longitudinal extension" also includes, within the framework of this invention, a comparison slit which has a grating constant which can no longer be resolved by the imaging, in particular the autofocus imaging. Such a comparison slit has an image without structure along its longitudinal extension.

If the intensity distribution of the grating slit cannot be resolved with a predetermined minimum contrast, a contrast-based autofocus is no longer possible, and the width of the comparison slit image is evaluated. Optionally, the projection of the longitudinally extended comparison slit is additionally also carried out only under this condition.

The decision whether the intensity distribution of the grating slit image can be resolved with a predetermined minimum contrast can be made using several criteria which are each sufficient in themselves but can also be used in combination:

1. The grating slit has a known grating frequency. The image of the grating slit can therefore be subjected to a Fourier analysis. If the frequencies which are predetermined by the structure of the grating slit do not occur in this Fourier analysis, or occur only with prefactors which lie below minimum values, this can be used to decide that the intensity distribution of the grating slit cannot be resolved with the predetermined minimum contrast.

2. In the case of a sufficient minimum contrast, strong intensity fluctuations are present in the grating slit image along the grating slit image. An insufficient resolution can therefore be recognized in the fact that the distance between intensity minimum and intensity maximum in the grating slit image remains below a minimum value.

3. Instead of such an absolute evaluation, it is also possible to carry out a relative evaluation using pixels of the autofocus camera that lie next to each other in the longitudinal direction of the grating slit image. The evaluation need not be limited to directly adjacent pixels; it is equally possible to consider differences in intensity inside a certain window. This window can also be shifted over the grating slit image, with the result that, with a statistical evaluation of the intensity minima and maxima occurring inside the window, it is possible to check whether the intensity distribution of the grating slit image can be resolved with a predetermined minimum contrast.

4. Finally, it is also possible to apply a contrast quality function, such as is known in the state of the art for assessing the image contrast.

In order to deduce the direction of the relative adjustment, in most embodiments it can suffice to determine the width of the minimum slit at two sites. The gradient of the width variation is then determined by calculating the difference between the widths, and the direction of the relative adjustment is deduced from the sign of the difference.

The widths can be determined at particular pixel sites in the autofocus camera image. To avoid artifacts which result from reflectivity jumps of the sample, it is preferred to define the sites in form of windows for which a width value is calculated by averaging or other statistical evaluation.

The extended capture range provided according to the invention preferably serves to adjust the relative position of sample and object plane as rapidly as possible such that the contrast-based autofocus, i.e., the evaluation of the intensity distribution of the grating slit image, can be used. It is therefore preferred to repeat steps c) and d) until either this contrast-based autofocus function can be realized or a predetermined number of repetitions is reached (stop criterion).

The gradient of the width variation (in the simplest case, the width difference) provides the direction of the relative adjustment. It is decided in what direction the adjustment is to be effected on the basis of the direction of the gradient (in the simplest case, the sign of the difference) and taking into account the direction of the inclination of the grating slit plane or camera image plane relative to the object plane. The relative adjustment must take place such that it shifts the object plane in the direction of the smaller width of the comparison slit image.

If the absolute value of one of the widths or of both widths or the ratio of the widths is evaluated, it can be estimated how large the relative shift must be in order to reach the capture range of the autofocus, which is based on the intensity distribution of the grating slit image. For this, a previously determined characteristic or the like can be consulted.

Reflectivity jumps inside the sample can lead to the grating slit image or the comparison slit image not being homogeneous. For such cases, it is preferable to shift the position of the grating slit and/or of the comparison slit in the grating slit plane. The necessity for such a shift can be recognized, for example, in the fact that, along the longitudinal direction, the comparison slit image has local intensity fluctuations which exceed a predetermined threshold.

In the case of such intensity fluctuations, the position of the sites at which the widths of the comparison slit are recorded can additionally or alternatively also be chosen such that they lie outside such intensity fluctuation ranges.

It is understood that the features mentioned above as well as those yet to be explained below can be used, not only in the stated combinations, but also in other combinations or alone, without departing from the scope of the present invention.

BRIEF DESCRIPTION OF THE DRAWINGS

The invention is explained yet more fully in the following, by way of example, with reference to the drawings, in which.

DETAILED DESCRIPTION

Figure 1:
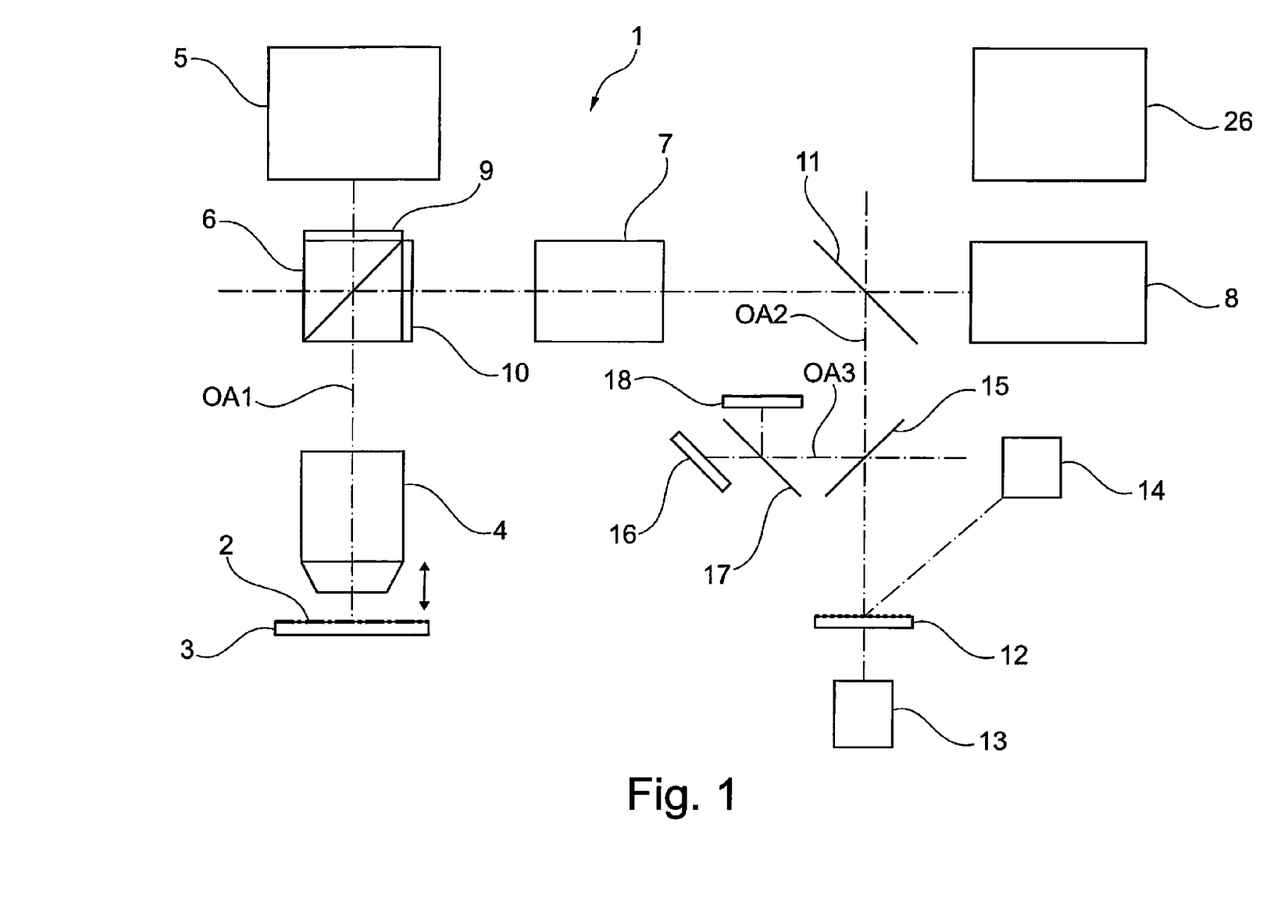
FIG. 1 is a block diagram of a microscope with an autofocus device for reflection measurements according to an embodiment of the claimed invention.

FIG. 1 shows a microscope 1, with which a sample 2 which is located on a sample holder 3 is imaged by means of an objective 4 onto a detector 5. The basic structure of the microscope corresponds to that of the microscope known from WO 2007/144197 A1. This applies in principle to the designs described there. As an alternative to the design of FIG. 1, the designs which are described in WO 2007/144197 A1 are thus also possible. The disclosure of WO 2007/144197 A1 entitled "Autofocus Device for Microscopy," published Dec. 21, 2007, is therefore incorporated by reference in full herein. The difference from the microscopes of WO 2007/144197 A1 lies firstly in the structure of the light modulator 12, which will be explained in more detail below with reference to FIG. 3, and secondly in an additional autofocus function, which will be described with reference to FIGS. 4 to 8.

The exemplary representation in FIG. 1 is greatly simplified. The microscope 1 can be a widefield microscope, i.e., the detector 5 is, e.g., a camera or an eyepiece. However, any other microscope design also comes into consideration for the microscope 1, for example, a laser scanning microscope. Then, the microscope beam path is provided with another scanning array which lies on the optical axis OA1. The focal position of the objective 4 is adjustable, as indicated by the double arrow. Alternatively, the sample holder 3 can also be adjustable. As a whole, a relative position between the object plane of the imaging in the microscope 1 and a sample 2 can thus be adjusted. It also lies within the framework of the invention to use a so-called internal focusing in which it is not the whole objective, but only particular lenses lying in the microscope or objective that can be moved.

On a beam splitter 6 which can optionally be designed dichroic or as a plate-type color splitter, microscope illumination radiation is coupled in from a microscope illumination source 8 which illuminates the sample 2 through the objective 4 via an illumination tube lens system 7. An autofocus device is coupled into this illumination beam path by means of a beam splitter 11. The autofocus device has a light modulator 12 which is illuminated by a light source 13, for example an LED, for transmission operation or by a light source 14 (e.g., an LED) for reflection operation depending on the design (transmission or reflection). The illuminated light modulator 12 generates a grating slit as modulation object. This is projected, i.e., imaged, into the sample 2 via the beam splitter 11, the illumination tube lens system 7, the beam splitter 6 as well as the objective 4. An autofocus illumination is thereby realized with the modulation object. The projection of the modulation object generated in the sample 2 is recorded in the opposite direction by means of a camera 16 which is preceded by a further beam splitter 15 on the optical axis OA2 of the autofocus device. The obtained optical axis OA3 is optionally further guided onto a camera 18 via a beam splitter 17.

The beam splitter 11 is designed dichroic in one design according to the invention and the light source 13 or 14 radiates at a wavelength which is not emitted to a significant extent by the microscope illumination source 8 or is not necessary for the sample imaging. The autofocus device thus functions in a spectral range which is not otherwise used for the imaging of the sample 2. This feature is not essential, i.e., the imaging and the autofocus function can also use the same wavelength range, wherein a simultaneous operation may no longer be possible. It is also possible for the same light source and/or the same camera to be used for the imaging and the autofocus function.

In the figures, generally only the image planes of the cameras are drawn. The cameras can be e.g., CCD or CMOS cameras.

In the design of FIG. 1, the light modulator 12, and thus the modulation object, lies perpendicular to the optical axis OA2 and in a plane conjugate to the object plane. In contrast, the image plane of the camera 16 is at an angle to the optical axis OA3 and to a conjugated plane of the object plane. The maximum contrast of the grating slit thereby lies in a line of the camera 16 lying perpendicular to the plane of drawing. The position of the line along the camera 16 is a measure for the position of the focal plane along the optical axis, i.e., in z-direction. Alternatively, the light modulator 12 can also be tilted and the camera image plane can be upright.

With the help of the illumination tube lens system 7 and the objective 4, the modulation object which is generated by the light modulator 12 according to the realization in transmission operation (light source 13) or in reflection operation (light source 14) is imaged into the sample. A depth resolution is carried out by the inclined camera 16. By means of the camera 18, a lateral shift of the sample illuminated in a structured manner can additionally be detected.

In the case of a fluorescence microscope, an excitation filter 10 and an emission filter 9 (for the fluorescence radiation) are used. Without further limitation with regard to the autofocus device, the microscope 1 can also be designed as a scanning microscope, in particular as a laser scanning microscope, Nipkow disk microscope or SPIM microscope.

Figure 2:
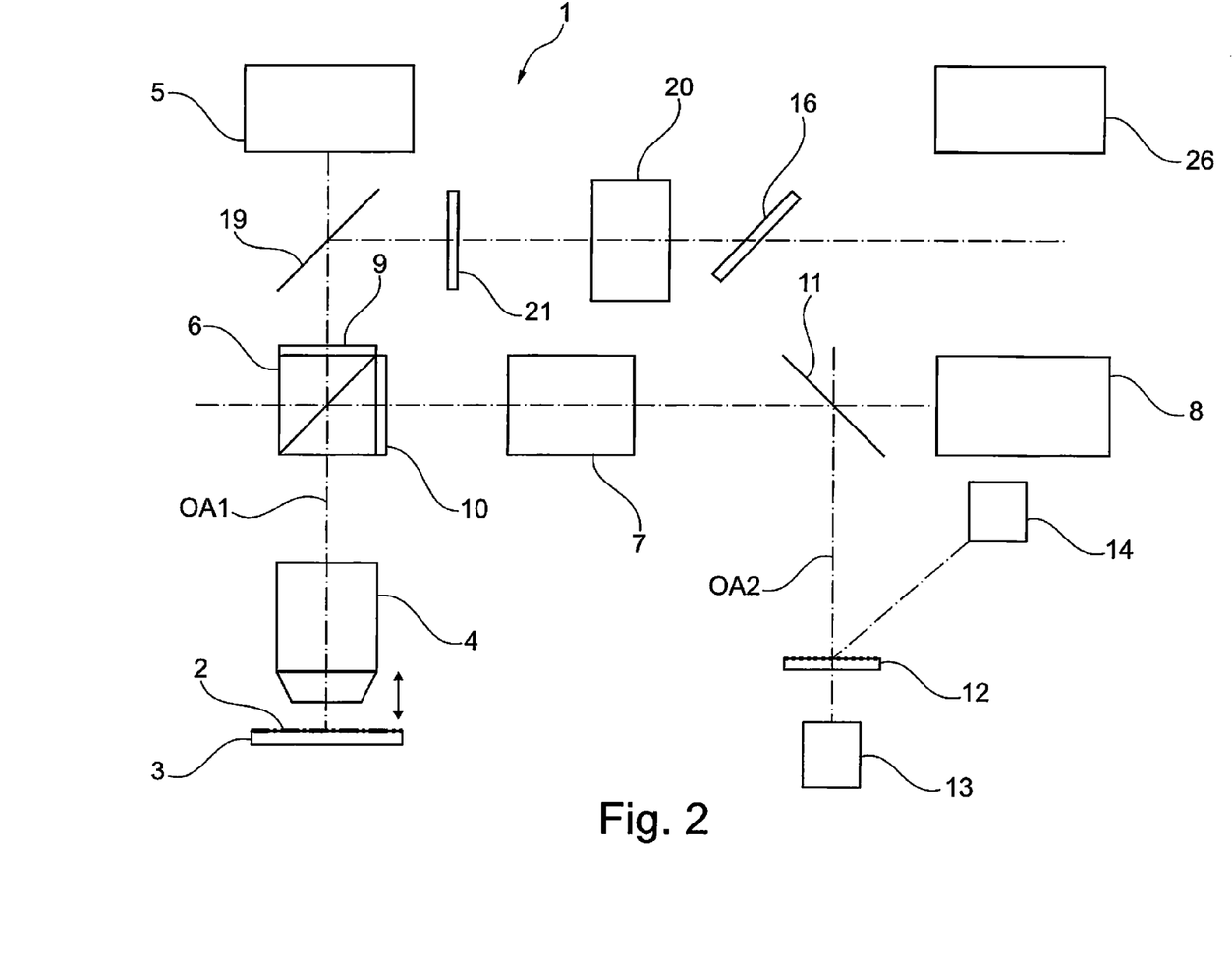
FIG. 2 is a block diagram of a microscope with an autofocus device for fluorescence measurements, according to an embodiment of the claimed invention.

FIG. 2 shows an alternative design of the microscope of FIG. 1 with regard to the autofocus device. In the microscope of FIG. 2, components which have already been explained with reference to FIG. 1 are provided with the same reference numbers; repeated description thereof is therefore dispensed with. The camera 16 here detects the fluorescence contrast of the sample, which can be further enhanced by the structured autofocus illumination. The imaging of the modulation object takes place similarly to that in the design according to FIG. 1. However, the recording of the modulation image imaged into the sample 2 does not take place from the illumination beam path, but via an independent beam splitter from the microscope beam path. This is adapted to the wavelength of the autofocus illumination and e.g. is dichroic to the same extent as the beam splitter 11. In order to be able to record the modulation object imaged into the sample or reflexes or backscatterings generated thereby by means of the camera 16, this camera is preceded by a corresponding relay optical unit 20, the optical characteristics of which ensure that the image plane of the camera 16 intersects a plane conjugate to the modulation object, ideally close to or on the optical axis (as also in FIG. 1).

The signals supplied by the focus device, in particular the camera 16, are utilized for the control of a focus adjustment along the z-axis. This is illustrated schematically in FIG. 1 by a double arrow. A control device 26 controls the autofocus function of the microscope 1.

If the microscope 1 in FIG. 2 is designed as a laser scanning microscope, the combination of emission filter 9 and excitation filter 10 is again provided, as well as optionally a further spectral filter 21 which ensures that the spectral range of the luminous modulation object falls onto the camera 16 and spectral ranges that are of no further interest are faded out, in particular the spectral ranges of the sample imaging.

The possible designs of the microscope correspond, with the exception of the configuration of the control device 26, to the state of the art according to WO 2007/144197 A1.

The designs of FIGS. 1 and 2 show the arrangement of the autofocus device in an upright microscope 1 with an object slide as a sample holder. A cover glass, as well as an immersion liquid (e.g., oil, water, glycerol), can be located between object slide and objective. However, this is not essential. There are thus two cases of application to be differentiated: The highest grating contrast of the air/gas boundary surface on the top side of the cover glass or of the object slide is obtained without immersion liquid. The highest grating contrast of the boundary surface between the underside of the cover glass and the embedding medium is obtained with immersion liquid. To suppress scattered light or undesired reflexes, diaphragms, e.g., semicircular diaphragms, can be introduced into the autofocus beam path.

The beam splitter 11 can be a plane-parallel glass sheet which is non-reflective on one side, without preventing disruptive secondary images. The side of the glass sheet serving to reflect the autofocus signal can also have a dichroic coating which increases the reflectivity for the long-wave autofocus light (if the variant with long-wave autofocus illumination is used), and can predominantly transmit the shorter-wave useful light of the microscopy (e.g. fluorescence radiation). Naturally, other spectral partitions are also possible.

Figure 3:
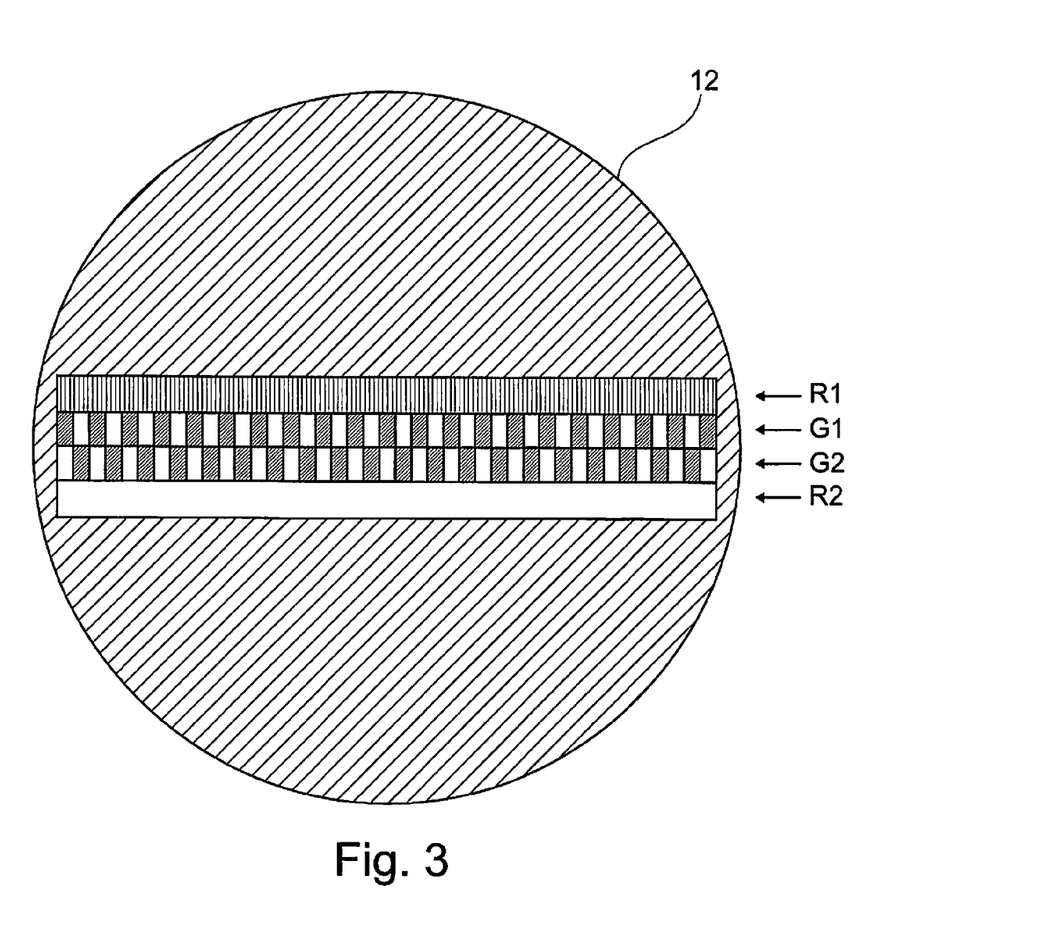
FIG. 3 is a top view of an example of a light modulator, according to an embodiment of the claimed invention.

FIG. 3 shows a top view of a design of the light modulator 12 for generating the modulation object, which is designed as a grating slit G1. The projection of the grating slit G1 generates striped contours in the sample. In addition to the grating slit G1, there is additionally also a further grating slit R1 which is designed as a comparison grating slit, with which a broadened capture range is realized.

The grating slit R1 has a grating frequency which is so high that it can no longer be resolved by the optical unit. The projection of the grating slit R1 is thus not structured in the plane of the autofocus camera or can no longer be resolved because of the camera pixelation.

In addition to the grating slit R1, in the image of FIG. 3 another slit R2 is also drawn which is not structured along its longitudinal extension. If it is projected onto the sample and then the projection is imaged onto the autofocus camera, this comparison slit image is brighter by the amount of the duty cycle of the grating slit R2.

The grating slit R2 and the grating slit R1 serve as a comparison slit for the grating slit G1.

By means of the grating slit G1, the following autofocus function known from the state of the art is realized in the microscope 1. The grating slit G1 is projected onto the sample 2. The projection of the grating slit G1 is imaged onto the autofocus camera. Because of the mentioned inclination, a contrast evaluation of the grating slit image provides the autofocus camera with an indication of the relative position of object plane and mentioned boundary surface of the sample 2. The contrast evaluation thus allows the object plane to be adjusted to a desired extent relative to the sample 2. This is known in the state of the art.

The grating slit R1 or the grating slit R2 serves to realize a broadened capture range for situations in which the grating slit image of the grating slit G1 does not form a sufficient contrast on the autofocus camera because the imaging is too strongly defocused. In such a situation, the grating slit R1 or the grating slit R2 is used as comparison slit. Only one of the two slits need be used, and the inclusion of both grating slits R1 and R2 in FIG. 3 is only intended to summarize different embodiments in one figure. The slits R1, G1, G2, R2 preferably, but not necessarily, run through the middle or close to the middle of the light modulator 12.

The broadened capture range which is realized by the grating slits R1 or R2 serving as a comparison slit is explained by way of example below using the example of the grating slit R1.

Figure 4:
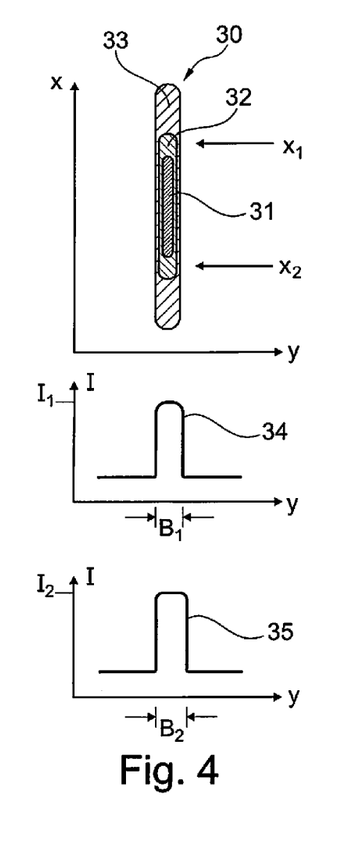
FIGS. 4 to 6 depict contrast signals to illustrate the functioning of the autofocus device.

The grating slit R1 is projected onto the sample 2 and imaged, as a comparison slit image, onto the autofocus camera 16. In the upper graph, FIG. 4 shows the relationships that arise when the sample is focused. In the camera image, the comparison slit image 30 is obtained in x- and y-coordinates. The intensity of the comparison slit image 30 is indicated by differently shaded zones 31 (high intensity) 32 (medium intensity) and 33 (low intensity). The width of the comparison slit image 30 at two coordinates $x_1$ and $x_2$ is substantially the same. The middle graph of FIG. 4 shows the intensity distribution of the comparison slit image 30 at the coordinate $x_1$. The intensity in the y-direction is given by the curve 34. The width of the comparison slit image 30 is given as a half width and has the value $B_1$ at the coordinate $x_1$. The lowest graph of FIG. 4 shows the variation of the intensity at right angles to the longitudinal extension of the comparison slit image 30 (correspondingly at right angles to the longitudinal extension of the grating slit R1) at the coordinate $x_2$. As the sample is focused and the comparison slit image 30 is accordingly not blurred, the width $B_2=B_1$ also results at the coordinate $x_2$.

Figure 5:
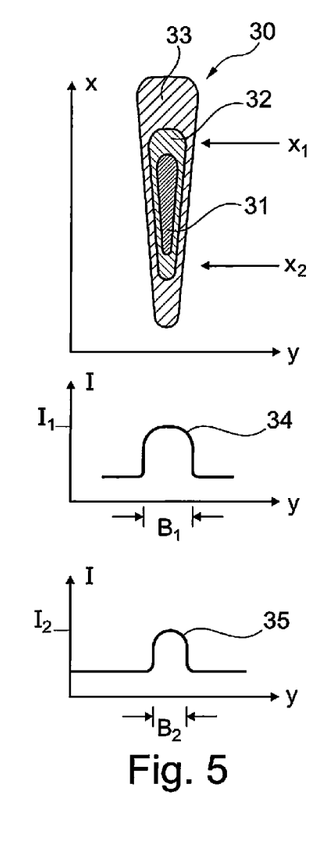

FIG. 5 shows the relationships in the case of a defocusing above the object plane. The comparison slit image 30 is blurred and the comparison of the curves 34 and 35 illustrates that the width $B_1$ is larger than the width $B_2$.

Figure 6:
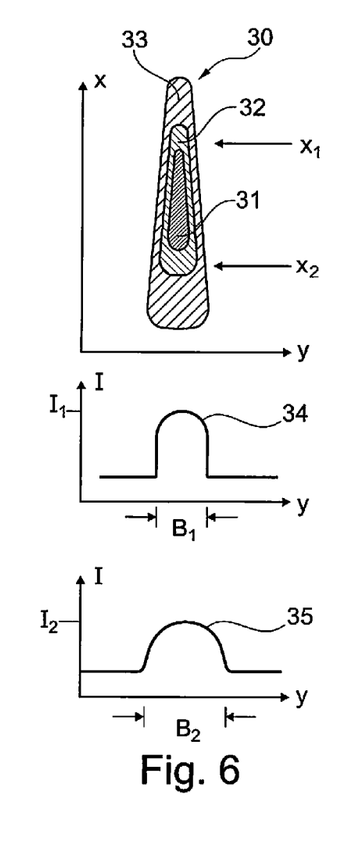

By contrast, the relationships are inverted in the image of FIG. 6, in which a defocusing below the object plane is present.

On the basis of a comparison of the widths (more precisely, the half widths), the direction of the defocusing is given.

Figure 7:
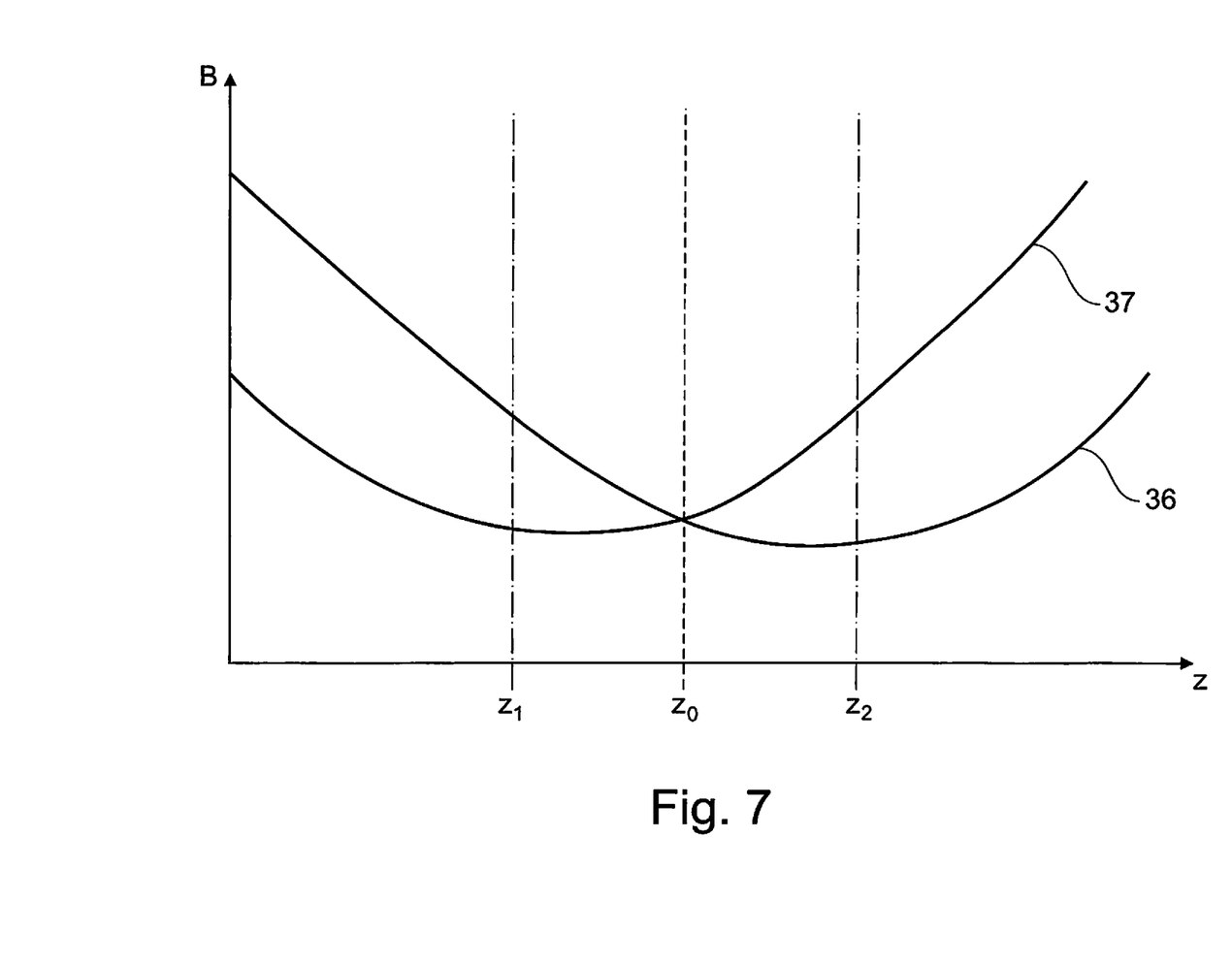
FIG. 7 depicts curves for the development of an autofocus method.

The experimentally determined relationship in FIG. 7 also optionally allows the amount of the defocusing to be estimated. In curves 36 and 37, FIG. 7 shows the widths $B_1$ and $B_2$ as a function of the defocusing, thus as a function of the z-coordinate. In the case of $z_0$ the boundary surface of the sample coincides with the object plane, i.e., the sample is focused. A contrast evaluation of the grating slit image of the grating slit G1 can take place between the values $z_1$ and $z_2$. This is the capture range of the autofocus technique according to the state of the art. If there is a defocusing at z-values below $z_1$ or above $z_2$, a contrast evaluation is no longer possible. The sign of the difference between the widths $B_1$ and $B_2$ makes it possible to indicate the direction in which a relative adjustment of sample and object plane must take place in order to cancel out the defocusing. To the left of $z_0$ the curve 36 runs above the curve 37—thus the half width $B_1$ is larger than the half width $B_2$. To the right of the z-position $z_0$ the curve 36 runs below the curve 37—the half width $B_2$ is thus larger than $B_1$ (corresponding to the relationships in FIG. 6). From the absolute value of one of the half widths $B_1$ or $B_2$, knowing the variation of FIG. 7, it is also possible to estimate the amount by which the relative adjustment has to take place. For example, from the absolute value of the width $B_1$, it is possible to determine for example from the curve 36 approximately how great the z-distance is from the value $z_0$. A relative adjustment by this amount and in the direction given by the sign then leads into the capture range of the contrast-evaluating autofocus function.

A more fail-safe approach is adopted if both widths $B_1$ and $B_2$ are evaluated in absolute or relative values and are evaluated knowing the relationship in FIG. 7 to determine a measure for the relative adjustment.

For the broadened capture range of the autofocus function achieved in this manner, both the grating slit R1 and the grating slit R2 can be used.

In FIG. 3, another grating slit G2 is additionally drawn which is complementary to the grating slit G1. It is easily recognizable that, when the grating slit image from G1 and the image of G2 are combined in the camera image plane, a comparison grating slit image 30 is obtained which no longer has a structure along the longitudinal variation of G1 or G2. The comparison grating slit image 30 can thus be realized not only by using a grating slit R1 with a fineness of structure which can no longer be resolved by the optical system, or by using a grating slit R2 which is not structured along its longitudinal extension, but also by using a grating slit G2 complementary to the grating slit G1 which is used for the contrast-based autofocus function, which grating slit G2 supplements the grating slit G1 such that grating slits G1 and G2 taken together have no structure along the longitudinal direction.

For the broadened capture range, it suffices to use one grating slit as a comparison grating slit. However, the accuracy of the autofocus method is sometimes influenced by the properties of the sample, as the sample modulates the projection of the comparison grating slit and thus, ultimately, the comparison grating slit image. This can lead to inaccuracies in the autofocus function and in the autofocus signal generated if the width determination (e.g., the half width determination) is thereby faulty. This can be compensated for by evaluating the width, not only at two sites $x_1$ and $x_2$, but in a window area, i.e., for several $x_1$ values and several $x_2$ values. It is also possible to use several comparison slits, e.g., to provide the comparison slit R1 or the comparison slit R2 several times in the modulation object 12.

The invention makes use of the fact that for a broadened capture range a comparison grating slit image is used which is not structured along the longitudinal extension of the grating slit forming the basis, i.e., along the direction that is predetermined by the grating slit which is used for the contrast-evaluating autofocus function. The intensity distribution in the comparison grating slit image varies along this longitudinal direction and has different widths if defocusing is present. The imaging can take place for different exposure times or at different illumination powers in order to achieve a sufficient intensity in the areas 31 to 33 of the comparison grating slit image 30.

In addition, the height of the curves 34 and 35 can also be used as a measure for the defocusing. The ratio $B_1/I_1$ or $B_2/I_2$ is likewise a measure for the defocusing and, analogously to the use of FIG. 7, makes it possible to determine the amount of the relative adjustment that is necessary in order to function again with the contrast-based autofocus—in other words in order to come from the broadened capture range into the normal capture range.

The widths $B_1$ and $B_2$ are usually half widths, i.e., the width that results when the intensity falls to half. However, other width dimensions can also be specified, for example, with a fall to 30%. Additionally or alternatively, deductions from the curves 34 and 35 can also be determined, for example $d(B_1/I_1)/dz$, wherein z is the variable for the distance between object plane and focal plane.

The evaluation in the broadened capture range, i.e., the mentioned width analysis of the comparison slit image 30, can be carried out repeatedly until a sufficient contrast for the grating slit G1 is achieved, which the conventional autofocus function allows.

If the sample has a height profile, such as, e.g., strip conductors in solar cells, the user may optionally desire to make a light-absorbing substrate or strip conductors lying higher sharp. For this case, it is optionally provided to provide a controller, with which a variable offset of the focal position can be adjusted, in operating software and/or in a console terminal. It thereby becomes possible to use a sample surface as a reflective surface for the autofocus, which surface lies in a depth plane other than the focal plane in which the features of the sample to be made sharp (e.g., strip conductor) lie. For example, the difference in height between substrate and strip conductors is adjusted with the offset control. The offset adjustment can take place manually or with the help of several autofocus measurements. Analogously, a retain focus function is thus also possible on biological samples.

In the case of samples that are not flat, e.g., lenses or mirror surfaces, the autofocus method can be combined with a motorized angle-adjustment device for the variable tilting of the sample. For this, the surface shape of the sample must be known and predetermined only roughly such that the surface remains in the capture range when the sample is moved laterally, and is always locally perpendicular to the optical axis. Under these conditions, with the autofocus method a curved surface can also be held at a constant distance from the objective, i.e., can be autofocused, when the sample is shifted laterally. Alternatively, this procedure can also be used to measure the shape of the sample by means of the autofocus method highly accurately (to within a few nanometers). This is a metrology application.

The autofocus method can be used as collision protection for an objective or sample. If the working distance of the objective is known, it can be deduced how far the sample surface is still removed from the objective. Accordingly, a warning or automatic switching-off of the z-drive can take place should the distance between objective and sample become too small.

A height profile of a sample surface can also be established with the autofocus method. For this, the sample is moved laterally, which can take place continuously or in steps. During the movement, the distance between objective and sample surface is then determined by means of the autofocus at regular or stochastic intervals. The height profile can be used to characterize the sample or for a rapid focusing in the case of an image acquisition rasterized later (image stitching).

If very flat reference samples are used, the shortcomings (e.g., radial run-out, angle errors) of the sample table can be measured with this method.

Instead of a height profile, a thickness profile of transparent samples, e.g., object slides, cover glasses, films or glass wafers, can also be recorded with the autofocus method. For this, the objective enlargement is preferably to be set such that the grating reflexes from the front and from the back of the transparent sample appear in the primary capture range at the same time. The distance between the two contrast maxima of the grating signals is then proportional to the thickness of the sample.

The autofocus method can be used for image-acquisition or inspection devices. These include in particular all types of microscope devices, wafer and wafer mask inspection devices, automated readers and metrological measurement devices. The samples can be of inorganic or organic type, wherein tissue parts or surfaces of living objects are also included.

Naturally, the light modulator 12 need not, as shown in FIG. 3, be designed as a static structure. It can be realized by means of a correspondingly controllable element which provides the modulation structure and the additional structures for the comparison structure. In principle this can also take place sequentially. This has the advantage that comparison structure and modulation structure can be imaged into the sample 2 at exactly the same site, with the result that the inherently small offset between comparison structure and modulation structure which exists for example between the grating slits G1 and R1 of FIG. 8 is eliminated. It is thus completely impossible for the reflectivity of the sample to fluctuate locally between the images of the grating slit and the comparison slit.

The areas on the autofocus camera allocated to the grating slit images and the comparison slit images can preferably consist of several columns and rows, with the result that an average can be taken over several columns or rows to minimize noise.

In all variants of the autofocus and tracking system, a computational control and evaluation device (e.g., a computer) is used which carries out the signal analysis and the control of the actuator (z-drive, xy-table, filter, etc.). Evaluation and control can be implemented by firmware and/or software technology. This control/evaluation device carries out all sequential control described here.

Instead of adjustable, e.g., electrically switchable, light modulators (e.g. LCD, DMD), static light modulators (transmission or phase gratings) can also be used. The projected modulation object can be shiftable on the sample side using tiltable plane-parallel plates or other devices. An exchange of the gratings can likewise be possible to vary the grating constants or structure. As explained, a two-dimensional grating structure can also be used which has several different grating periods, for example, 2 to 10 striped gratings arranged next to each other with different grating frequencies. Depending on the design, each structure can be provided with a comparison object of its own or also several or all of the grating structures can be provided with a common comparison object.

As the autofocus method can preferably (but not necessarily) function with two-dimensional (flat) cameras, the most suitable grating for each application case can then be chosen in the case of several grating lines by reading the corresponding camera lines, without the need to carry out mechanical changes (e.g., exchange of the grating).

The described principle of the light modulator which provides a modulation structure and a comparison structure can be used not only in a microscope such as described by WO 2007/144197 A1, but a microscope with the design according to DE 10319182 A1 entitled "Method and Arrangement for Determining the Focus Position in the Imaging of a Sample," also comes into consideration. The disclosure of DE 10319182 A1 is therefore herein incorporated by reference in full in this respect. The modulation structure and the structure necessary for the comparison structure are then located on an edge of a confocal slit diaphragm running at an angle. The imaging of the modulation object as well as of the comparison object thus takes place mostly through the beam path which is also provided for the sample imaging in the microscope.

Where method steps or particular methods or modes of operation are described in this description, these are realized by a control device belonging to the autofocus device, e.g., as in the control device 26. Naturally, a control device present in any case in the microscope 1 can also take over the corresponding control tasks.

The invention claimed is:

1. An autofocus method for a microscope with an objective which images a sample lying in an object plane, the method comprising the following steps:
   a) projecting onto the sample a longitudinally extended grating slit which extends in a grating slit plane, and imaging the projection of the grating slit as a grating slit image onto an autofocus camera which has a camera image plane, wherein either the grating slit plane or the camera image plane lies at an angle to a plane which is conjugate to the object plane, is deduced,
   b) projecting onto the sample a longitudinally extended comparison slit which extends parallel to the grating slit in the grating slit plane and is not structured along its longitudinal extension, and imaging the projection of the comparison slit as a comparison slit image onto the autofocus camera, and
   c) determining a width of the comparison slit image at right angles to the longitudinal extension at at least two sites which are spaced apart along the longitudinal extension,
   d) determining a width variation of the comparison slit image and a gradient of the width variation, and
   e) determining a direction of a relative adjustment of sample and object plane.

2. The autofocus method according to claim 1, wherein the relative adjustment is carried out in the direction determined in step e) until an intensity distribution of the grating slit image can be resolved with a predetermined minimum contrast.

3. The autofocus method according to claim 1, wherein in step c) the width of the comparison slit image is evaluated at two sites and the gradient of the width variation is determined by calculating the difference between the two widths and wherein in step e) the direction of the relative adjustment is determined from the sign of the difference.

4. The autofocus method according to claim 2, wherein steps b) and c) are repeated until either an intensity distribution of the grating slit image can be resolved with a predetermined minimum contrast or until a predetermined number of repetitions is reached.

5. The autofocus method according to claim 1, wherein from the absolute value of one or both of the widths, an amount of the relative adjustment of a sample plane and an object plane is determined.

6. The autofocus method according to claim 1, wherein a ratio of the width of comparison slit image and the width variation of the comparison slit image is calculated and an amount of relative adjustment of a sample plane and an object plane is determined from the ratio.

7. The autofocus method according to claim 1, wherein a position of the grating slit and/or of the comparison slit is shifted into the grating slit plane if the comparison slit image has local intensity fluctuations which exceed a predetermined threshold.

8. An autofocus method for a microscope with an objective which images a sample lying in an object plane, the method comprising the following steps:
   a) projecting onto the sample a longitudinally extended grating slit which extends in a grating slit plane, and imaging the projection of the grating slit as a grating slit image onto an autofocus camera which has a camera image plane, wherein either the grating slit plane or the camera image plane lies at an angle to a plane which is conjugate to the object plane,
   b) projecting onto the sample a longitudinally extended comparison slit which is structured complementary to the grating slit and extends parallel to the grating slit in the grating slit plane, and imaging the projection of the comparison slit onto the autofocus camera and combining this image with the grating slit image to form a comparison slit image, and
   c) evaluating the width of the comparison slit image at right angles to the longitudinal extension at at least two sites which are spaced apart along the longitudinal extension, d) determining a width variation of the comparison slit image and a gradient of the width variation, and e) determining a direction of a relative adjustment of sample and object plane.

9. The autofocus method according to claim 8, wherein the relative adjustment is carried out in the direction determined in step e) until an intensity distribution of the grating slit image can be resolved with a predetermined minimum contrast.

10. The autofocus method according to claim 8, wherein in step c) the width of the comparison slit image is evaluated at two sites and the gradient of the width variation is determined by calculating the difference between the two widths and wherein in step e) the direction of the relative adjustment is determined from the sign of the difference.

11. The autofocus method according to claim 9, wherein steps b) and c) are repeated until either an intensity distribution of the grating slit image can be resolved with a predetermined minimum contrast or until a predetermined number of repetitions is reached.

12. The autofocus method according to claim 8, wherein from the absolute value of one or both of the widths, an amount of the relative adjustment of a sample plane and an object plane is determined.

13. The autofocus method according to claim 8, wherein a ratio of the width of comparison slit image and the width variation of the comparison slit image is calculated and an amount of relative adjustment of a sample plane and an object plane is determined from the ratio.

14. The autofocus method according to claim 8, wherein a position of the grating slit and/or of the comparison slit is shifted into the grating slit plane if the comparison slit image has local intensity fluctuations which exceed a predetermined threshold.

15. A microscope with an objective that has an object plane lying in a sample space, and with an autofocus device that has:
a longitudinally extended grating slit which extends in a grating slit plane,
a longitudinally extended comparison slit which extends parallel to the grating slit in the grating slit plane and is not structured along its longitudinal extension,
an autofocus illumination optical unit which projects the grating slit and the comparison slit into the sample space,
an autofocus camera with a camera image plane,
an autofocus imaging optical unit which images the projection of the grating slit onto the autofocus camera to form a grating slit image on the autofocus camera and which images the projection of the comparison slit onto the autofocus camera to form a comparison slit image on the autofocus camera,
wherein either the grating slit plane or the camera image plane lies at an angle to a plane which is conjugate to the object plane, and
wherein the microscope further comprises a control device which is designed to determine a width of the comparison slit image at right angles to the longitudinal extension at at least two sites which are spaced apart along the longitudinal extension of the comparison slit, to determine a width variation of the comparison slit image and a gradient of the width variation, and to determine a direction of relative adjustment of sample and object plane.

16. The microscope according to claim 15, wherein the comparison slit is a grating slit comprising a grating constant which lies below a resolution limit of the autofocus imaging optical unit.

17. A microscope with an objective which has an object plane lying a sample space, and with an autofocus device which has
a longitudinally extending grating slit which extends in a grating slit plane,
a longitudinally extended comparison slit which extends parallel to the grating slit in a grating slit plane and which is structured complementary to the grating slit along its longitudinal extension,
an autofocus illumination optical unit which projects the grating slit and the comparison slit into the sample space,
an autofocus camera with the camera image plane,
an autofocus imaging unit which images the projection of the granting slit onto the autofocus camera to form a grating slit image on the autofocus camera and which images the projection of the projection of the comparison slit onto the autofocus camera to form a comparison image on the autofocus camera,
wherein our the grating slit plane on the camera image plane lies at an angle to a plane which is conjugated to the object plane, and
wherein the microscope comprises a control device which is designed to combine the grating slit image and the comparison slit image to form a modified comparison slit image, to determine a width of the modified comparison image at right angles to the longitudinal extension at at least two sites which are spaced apart along the longitudinal extension, to determine a width variation of the modified comparison slit image and a gradient of the width variation, and to determine a direction of a relative adjustment of sample on an object plane.

* * * * *